United States Patent
Wei et al.

(10) Patent No.: US 9,848,315 B2
(45) Date of Patent: Dec. 19, 2017

(54) DISCOVERY MESSAGE METHOD CONFIGURATION SELECTION

(71) Applicant: Sony Corporation, Tokyo (JP)

(72) Inventors: Na Wei, Beijing (CN); Anders Berggren, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 693 days.

(21) Appl. No.: 14/245,529

(22) Filed: Apr. 4, 2014

(65) Prior Publication Data

US 2015/0215760 A1     Jul. 30, 2015

(30) Foreign Application Priority Data

Jan. 30, 2014    (CN) ........................ 2014 1 0044201

(51) Int. Cl.
| | |
|---|---|
| *H04W 4/00* | (2009.01) |
| *H04W 8/00* | (2009.01) |
| *H04W 76/02* | (2009.01) |

(52) U.S. Cl.
CPC ........... *H04W 8/005* (2013.01); *H04W 4/005* (2013.01); *H04W 76/023* (2013.01)

(58) Field of Classification Search
CPC .... H04W 4/005; H04W 76/023; H04W 8/005
See application file for complete search history.

(56) References Cited

U.S. PATENT DOCUMENTS

| | | | | |
|---|---|---|---|---|
| 2008/0225778 A1* | 9/2008 | Vare | ....................... | H04H 20/26 370/328 |
| 2014/0094212 A1* | 4/2014 | Ahn | ....................... | H04W 48/16 455/517 |
| 2014/0112194 A1* | 4/2014 | Novlan | ................. | H04W 8/005 370/254 |

OTHER PUBLICATIONS

Intel et al.: "Proposed conclusion on ProSe direct discovery", 3GPP Draft; S2-140315_Disco_Conclusion, 3rd Generation Partnership Project (3GPP), Mobile Competence Centre; 650, Route des Lucioles; F-06921 Sophia-Antipolis Cedex; France, vol. SA WG2, no. Taipei, Taiwan; Jan. 20, 2014-Jan. 24, 2014; Jan. 19, 2014, XP050744634, Retrieved from the Internet: URL:http://www.3gpp.org/ftp/Meetings_3GPP_SYNC/SA/SA2/Docs/ [retreived on Jan. 19, 2014].

(Continued)

*Primary Examiner* — Khalid Shaheed
(74) *Attorney, Agent, or Firm* — James C. Edwards; Moore & Van Allen PLLC

(57) ABSTRACT

Embodiments are directed to systems, methods and computer program products for enhancing proximity service (ProSe) device to device discovery. A user device determines a discovery message method configuration from a plurality of discovery message method configurations, where determining comprises accessing at least one discovery message method configuration rule configured to dictate which from the plurality of discovery message method configurations corresponds with each of a plurality of unique combinations of one or more rule circumstances; determining a combination of one or more actual circumstances; determining which of the plurality of unique combinations of one or more rule circumstances matches the combination of one or more actual circumstances; and determining which of the plurality of discovery message method configurations corresponds with the determined unique combination of one or more rule (Continued)

circumstances that matches the combination of one or more actual circumstances.

26 Claims, 3 Drawing Sheets

(56) References Cited

OTHER PUBLICATIONS

Qualcomm Incorporated et al.: "ProSe Discovery further conclusions". 3GPP Draft; S2-140082-Discovery-Pubs-R4, 3rd Generation Partnership Project (3GPP), Mobile Competence Centre; 650, Route des Lucioles; F-06921 Sophia-Antipolis Cedex; France, vol. SA WG2, no. Taipei, Taiwan; Jan. 20, 2014-Jan. 24, 2014; Jan. 19, 2014, XP050744457, Retrieved from the Internet: URL:http://www.3gpp.org/ftp/Meetings_3GPP_SYNC/SA/SA2/Docs/ [retreived on Jan. 19, 2014].

Intel et al.: "Consolidated description of solutions for ProSe Discovery using ProSe Communication capability (D3, D6, D7)", 3GPP Draft; S2-140377_WAS4131_D3D6D7_Consolidation, 3rd Generation Partnership Project (3GPP), Mobile Competence Centre; 650, Route des Lucioles; F-06921 Sophia-Antipolis Cedex; France, vol. SA WG2, no. Taipei, Taiwan; Jan. 20, 2014-Jan. 24, 2014; Jan. 19, 2014, XP050744653, Retrieved from the Internet: URL:http://www.3gpp.org/ftp/Meetings_3GPP_SYNC/SA/SA2/Docs/ [retreived on Jan. 19, 2014].

Qualcomm Incorporated: "Evaluation of ProSe discovery through communication", 3GPP Draft; S2-140391-DTC Evaluation-R3, 3rd Generation Partnership Project (3GPP), Mobile Competence Centre; 650, Route des Lucioles; F-06921 Sophia-Antipolis Cedex; France, vol. SA WG2, no. Taipei, Taiwan; Jan. 20, 2014-Jan. 24, 2014; Jan. 19, 2014, XP050765508, Retrieved from the Internet: URL:http://www.3gpp.org/ftp/Meetings_3GPP_SYNC/SA/SA2/Docs/ [retreived on Jan. 19, 2014].

International Search Report and Written Opinion; dated Nov. 21, 2014; issued in International Patent Application No. PCT/IB2014/060603.

International Preliminary Report on Patentability; dated Aug. 11, 2016; issued in International Patent Application No. PCT/IB2014/060603.

* cited by examiner

DISCOVERY MESSAGE METHOD CONFIGURATION SELECTION

BACKGROUND

The Third Generation Partnership Project (3GPP) radio access network (RAN) collaboration has addressed device to device (D2D) proximity services (ProSe) or proximity based applications. A core component of proximity services is discovery of user equipment (UE), also referred to as user devices, apparatuses and the like. ProSe discovery may involve two or more UEs in proximity to one another. Identified use cases for proximity-based services include public safety and non-public safety scenarios.

BRIEF SUMMARY

Embodiments of the invention are directed to systems, methods and computer program products for enhancing proximity service (ProSe) device to device (D2D) discovery. According to embodiments of the invention, a method includes determining, by a user device, a discovery message method configuration from a plurality of discovery message method configurations, wherein determining comprises accessing at least one discovery message method configuration rule configured to dictate which from the plurality of discovery message method configurations corresponds with each of a plurality of unique combinations of one or more rule circumstances; determining a combination of one or more actual circumstances; determining which of the plurality of unique combinations of one or more rule circumstances matches the combination of one or more actual circumstances; and determining which of the plurality of discovery message method configurations corresponds with the determined unique combination of one or more rule circumstances that matches the combination of one or more actual circumstances.

In some embodiments, the method includes initiating, by the user device, discovery messaging using the determined discovery message method configuration.

In some embodiments, the plurality of discovery message method configurations comprises a fixed length direct discovery message method configuration (DD Configuration); wherein the DD Configuration is configured for use over a physical layer of a networking model; and wherein the physical layer is the lowest layer of the networking model; and a discovery through communication variable length discovery message method configuration (DTC Configuration); wherein the DTC Configuration is configured for use over a layer of the networking model that is higher than the physical layer. In some such embodiments, wherein the user device is one of a plurality of user devices, which together form a user device group. In some such embodiments, the method includes receiving, by the user device, a control message comprising a discovery message method configuration indicator; wherein the control message is received using dedicated radio resource control (RRC) signaling, non-dedicated RRC signaling, dedicated control signaling or beacon signaling; wherein determining a combination of one or more actual circumstances comprises determining that the combination of one or more actual circumstances consists of the discovery message method configuration indicator; wherein determining which of the plurality of unique combinations of one or more circumstances matches the combination of one or more actual circumstances comprises determining data from the discovery message method configuration indicator; and matching the determined data with one of the plurality of unique combinations of one or more rule circumstances; wherein determining which of the plurality of discovery message method configurations corresponds with the determined unique combination of one or more rule circumstances that matches the combination of one or more actual circumstances comprises determining which of the DD Configuration or the DTC Configuration to use for discovery message method configuration; and enabling, by the user device, only the DD Configuration or the DTC Configuration based on the determination of which configuration to use for discovery message method configuration.

In some such embodiments, the discovery message method configuration indicator consists of one bit of data configured to indicate either the DD Configuration or the DTC Configuration for use for discovery message method configuration. In other such embodiments, the discovery message method configuration indicator comprises a plurality of bits of data configured to indicate that the DD Configuration should be used for a first plurality of types of discovery user cases and to indicate that the DTC Configuration should be used for a second plurality of types of discovery user cases.

In some embodiments, accessing at least one discovery message method configuration rule comprises accessing, by the user device from a memory device of the user device, one or more pre-configuration rules. In some such embodiments, determining a combination of one or more actual circumstances comprises determining that the user device is configured as a commercial user type or a public safety user type; wherein determining which of the plurality of unique combinations of one or more circumstances matches the combination of one or more actual circumstances comprises matching the commercial user type or the public safety user type, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used, if the user device is configured as a commercial user type, and that the DTC Configuration should be used, if the user device is configured as a public safety type, for discovery message method configuration; and the method further comprising enabling, by the user device, only the DD Configuration or the DTC Configuration based on the determination of which configuration to use for discovery message method configuration.

In some embodiments, determining a combination of one or more actual circumstances comprises determining that the user device is configured as a public safety user type and determining that the user device is within network coverage or outside network coverage; determining which of the plurality of unique combinations of one or more circumstances matches the combination of one or more actual circumstances comprises matching the public safety user type and within network coverage or the public safety user type and outside network coverage, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used, if the within network coverage, and that the DTC Configuration should be used, if the user device is configured as a public safety user type and is outside network coverage, for discovery message method configuration; and the method further comprising enabling, by the user device, only the DD Configuration or the DTC Configuration based on the determination of which configuration to use for discovery message method configuration.

In some embodiments, determining a combination of one or more actual circumstances comprises determining that the user device is configured as a public safety user type and determining that there is a need to find other public safety user devices or that the user device is configured as a public safety user type and determining there is a need to find commercial user devices; determining which of the plurality of unique combinations of one or more circumstances matches the combination of one or more actual circumstances comprises matching the public safety user type and need to find other public safety user devices or the public safety user type and need to find commercial user devices, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used, if the user device is configured as a public safety user type and there is a need to find commercial users, and that the DTC Configuration should be used, if the user device is configured as a public safety user type and there is a need to find other public safety user devices, for discovery message method configuration; and the method further comprising enabling, by the user device, only the DD Configuration or the DTC Configuration based on the determination of which configuration to use for discovery message method configuration.

In some embodiments, determining a combination of one or more actual circumstances comprises determining an actual type of discovery to be used; determining which of the plurality of unique combinations of one or more circumstances matches the combination of one or more actual circumstances comprises matching the actual type of discovery to be used with one of a plurality of first types of discovery or one of a plurality of second types of discovery, wherein each of the plurality of first types of discovery and each of the plurality of second types of discovery correspond with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used, if one of the plurality of first types of discovery is to be used, and that the DTC Configuration should be used, if one of the plurality of second types of discovery is to be used, for discovery message method configuration; and the method further comprising enabling, by the user device, only the DD Configuration or the DTC Configuration based on the determination of which configuration to use for discovery message method configuration.

In some such embodiments, determining an actual type of discovery to be used comprises determining whether the actual type of discovery to be used is a closed loop discovery or an open loop discovery; wherein the plurality of first types of discovery comprises the open loop discovery; and wherein the plurality of second types of discovery comprises the closed loop discovery, such that the DD Configuration should be used for open loop discovery and the DTC Configuration should be used for closed loop discovery; wherein determining an actual type of discovery to be used comprises determining whether the actual type of discovery to be used is a Mode B type of discovery or a Mode A type of discovery; wherein the plurality of first types of discovery comprises the Mode A type of discovery; and wherein the plurality of second types of discovery comprises the Mode B type of discovery, such that the DD Configuration should be used for the Mode A type of discovery and the DTC Configuration should be used for the Mode B type of discovery.

In some embodiments, determining a combination of one or more actual circumstances comprises determining that the user device is within network coverage and has network assistance on one or more dedicated discovery resources; determining which of the plurality of unique combinations of one or more circumstances matches the combination of one or more actual circumstances comprises matching that the user device is within network coverage and has network assistance on one or more dedicated discovery resources, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used for discovery message method configuration; and the method further comprising enabling, by the user device, only the DD Configuration based on the determination to use DD Configuration for discovery message method configuration.

In some embodiments, determining a combination of one or more actual circumstances comprises determining that the user device is part of a public safety group comprising a group head having assigned dedicated discovery resources; determining which of the plurality of unique combinations of one or more circumstances matches the combination of one or more actual circumstances comprises matching that the that the user device is part of a public safety group comprising a group head having assigned dedicated discovery resources, as determined by the user device, with one of the plurality of unique combinations of one or more rule circumstances; determining which of the plurality of discovery message method configurations corresponds with the determined unique combination of one or more rule circumstances that matches the combination of one or more actual circumstances comprises determining that the DD Configuration should be used for discovery message method configuration; and the method further comprising enabling, by the user device, only the DD Configuration based on the determination to use DD Configuration for discovery message method configuration.

In some embodiments, determining a combination of one or more actual circumstances comprises determining that the user device will engage in a one-to-one unicast discovery within a predetermined period of time; determining which of the plurality of unique combinations of one or more circumstances matches the combination of one or more actual circumstances comprises matching that the user device will engage in a one-to-one unicast discovery within a predetermined period of time, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used for discovery message method configuration; and the method further comprising enabling, by the user device, only the DD Configuration based on the determination to use DD Configuration for discovery message method configuration.

In some embodiments, determining a combination of one or more actual circumstances comprises determining that the user device is only capable of supporting the DD Configuration; determining which of the plurality of unique combinations of one or more circumstances matches the combination of one or more actual circumstances comprises matching that the user device is only capable of supporting the DD Configuration, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used for discovery message method configuration; and the method further comprising enabling, by the user device, only the DD Configuration based on the determination to use DD Configuration for discovery message method configuration.

In some embodiments, determining a combination of one or more actual circumstances comprises determining that the user device is incapable of supporting the DTC Configuration; determining which of the plurality of unique combinations of one or more circumstances matches the combination of one or more actual circumstances comprises matching that the user device is incapable of supporting the DTC Configuration, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DD Configuration should be used for discovery message method configuration; and the method further comprising enabling, by the user device, only the DD Configuration based on the determination to use DD Configuration for discovery message method configuration.

In some embodiments, determining a combination of one or more actual circumstances comprises determining that the user device is outside network coverage and has no network or group head assistance on dedicated discovery resources; determining which of the plurality of unique combinations of one or more circumstances matches the combination of one or more actual circumstances comprises matching that the user device is outside network coverage and has no network or group head assistance on dedicated discovery resources, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

In some embodiments, wherein determining a combination of one or more actual circumstances comprises determining that the user device will engage a groupcast or broadcast discovery within a predetermined period of time; determining which of the plurality of unique combinations of one or more circumstances matches the combination of one or more actual circumstances comprises matching that the user device will engage a groupcast or broadcast discovery within a predetermined period of time, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

In some embodiments, determining a combination of one or more actual circumstances comprises determining that the user device will engage one of a plurality of types of discovery each requiring security related information, user device application state or user device capabilities within a predetermined period of time; determining which of the plurality of unique combinations of one or more circumstances matches the combination of one or more actual circumstances comprises matching that the user device will engage one of a plurality of types of discovery each requiring security related information, user device application state or user device capabilities within a predetermined period of time, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

In some embodiments, determining a combination of one or more actual circumstances comprises determining that the user device is only capable of supporting the DTC Configuration; determining which of the plurality of unique combinations of one or more circumstances matches the combination of one or more actual circumstances comprises matching that the user device is only capable of supporting the DTC Configuration, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

In some embodiments, determining a combination of one or more actual circumstances comprises determining that the user device is incapable of supporting the DD Configuration; determining which of the plurality of unique combinations of one or more circumstances matches the combination of one or more actual circumstances comprises matching that the user device is incapable of supporting the DD Configuration, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

In some embodiments, determining a combination of one or more actual circumstances comprises determining that the DD Configuration is unavailable for the user device to use for discovery messaging; determining which of the plurality of unique combinations of one or more circumstances matches the combination of one or more actual circumstances comprises matching that the DD Configuration is unavailable for the user device to use for discovery messaging, as determined by the user device, with one of the plurality of unique combinations of one or more rule circumstances; wherein determining which of the plurality of discovery message method configurations corresponds with the determined unique combination of one or more rule circumstances that matches the combination of one or more actual circumstances comprises determining that the DTC Configuration should be used for discovery message method configuration; and the method further comprising enabling, by the user device, only the DTC Configuration based on the determination to use DTC Configuration for discovery message method configuration.

According to embodiments of the invention, a user device comprises a memory; a processor; and a module stored in the memory, executable by the processor, and configured to determine a discovery message method configuration from a plurality of discovery message method configurations, wherein determining comprises accessing at least one discovery message method configuration rule configured to dictate which from the plurality of discovery message method configurations corresponds with each of a plurality of unique combinations of one or more rule circumstances; and determining a combination of one or more actual circumstances; determining which of the plurality of unique combinations of one or more rule circumstances matches the combination of one or more actual circumstances; and determining which of the plurality of discovery message method configurations corresponds with the determined unique combination of one or more rule circumstances that matches the combination of one or more actual circumstances.

According to embodiments of the invention, a computer program product comprises a non-transitory computer-readable medium comprising a set of codes for causing a computer to determine a discovery message method configuration from a plurality of discovery message method configurations, wherein determining comprises accessing at least one discovery message method configuration rule configured to dictate which from the plurality of discovery message method configurations corresponds with each of a plurality of unique combinations of one or more rule circumstances; and determining a combination of one or more actual circumstances; determining which of the plurality of unique combinations of one or more rule circumstances matches the combination of one or more actual circumstances; and determining which of the plurality of discovery message method configurations corresponds with the determined unique combination of one or more rule circumstances that matches the combination of one or more actual circumstances.

BRIEF DESCRIPTION OF THE DRAWINGS

Figure 1:
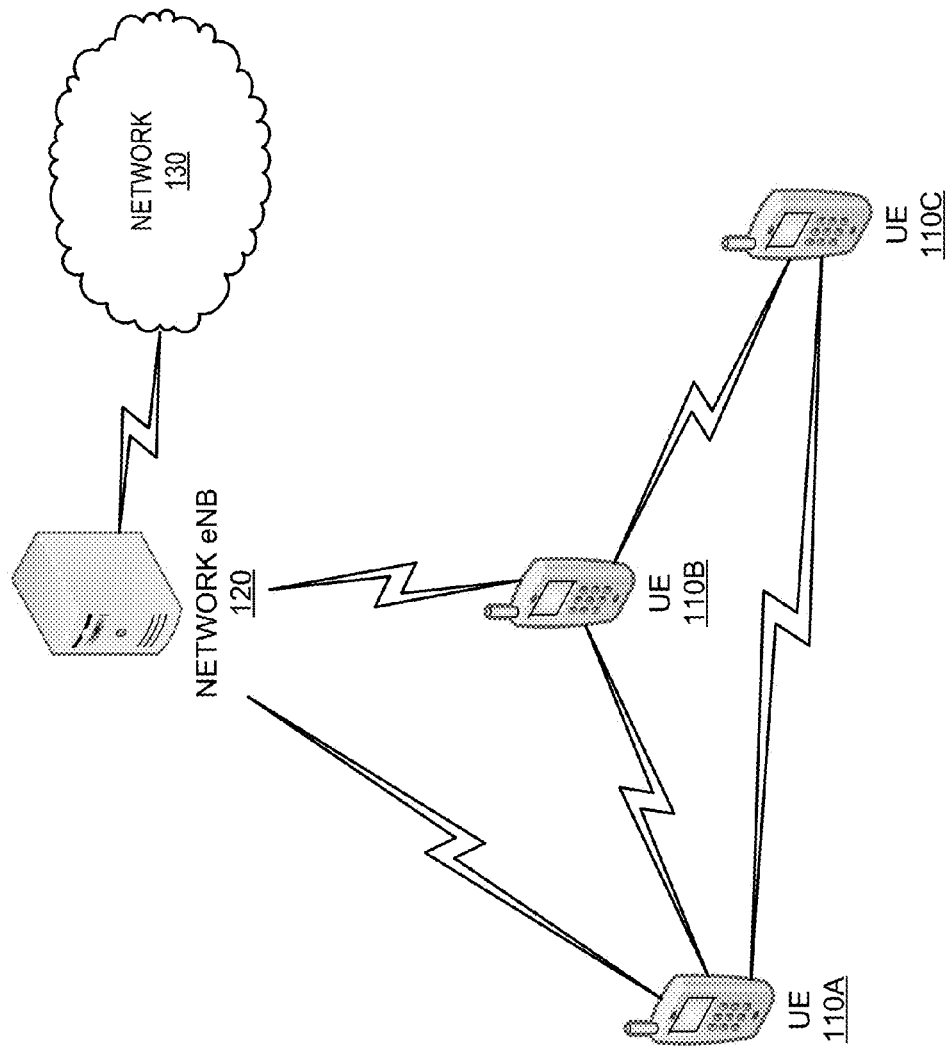
Figure 2:
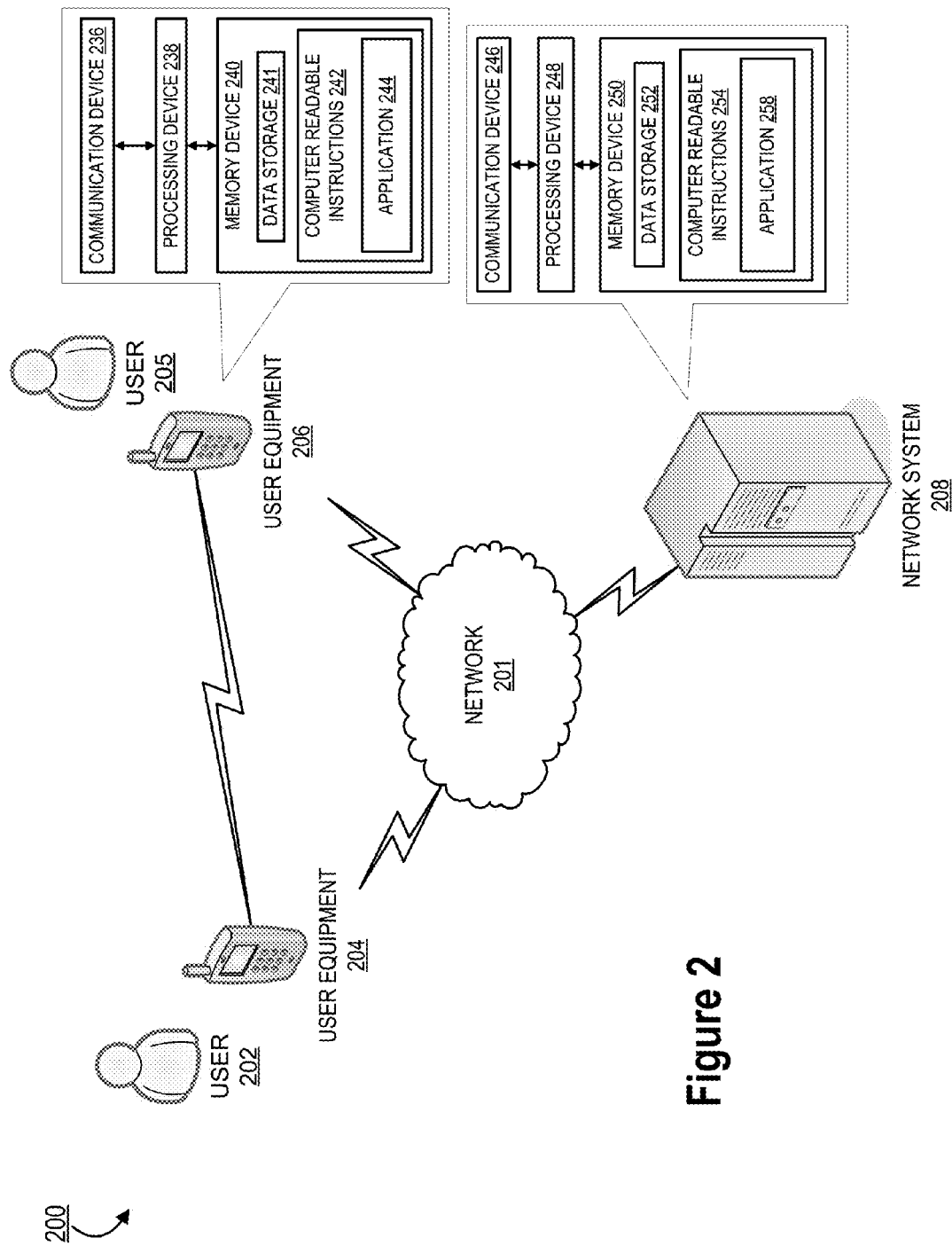
Figure 3:
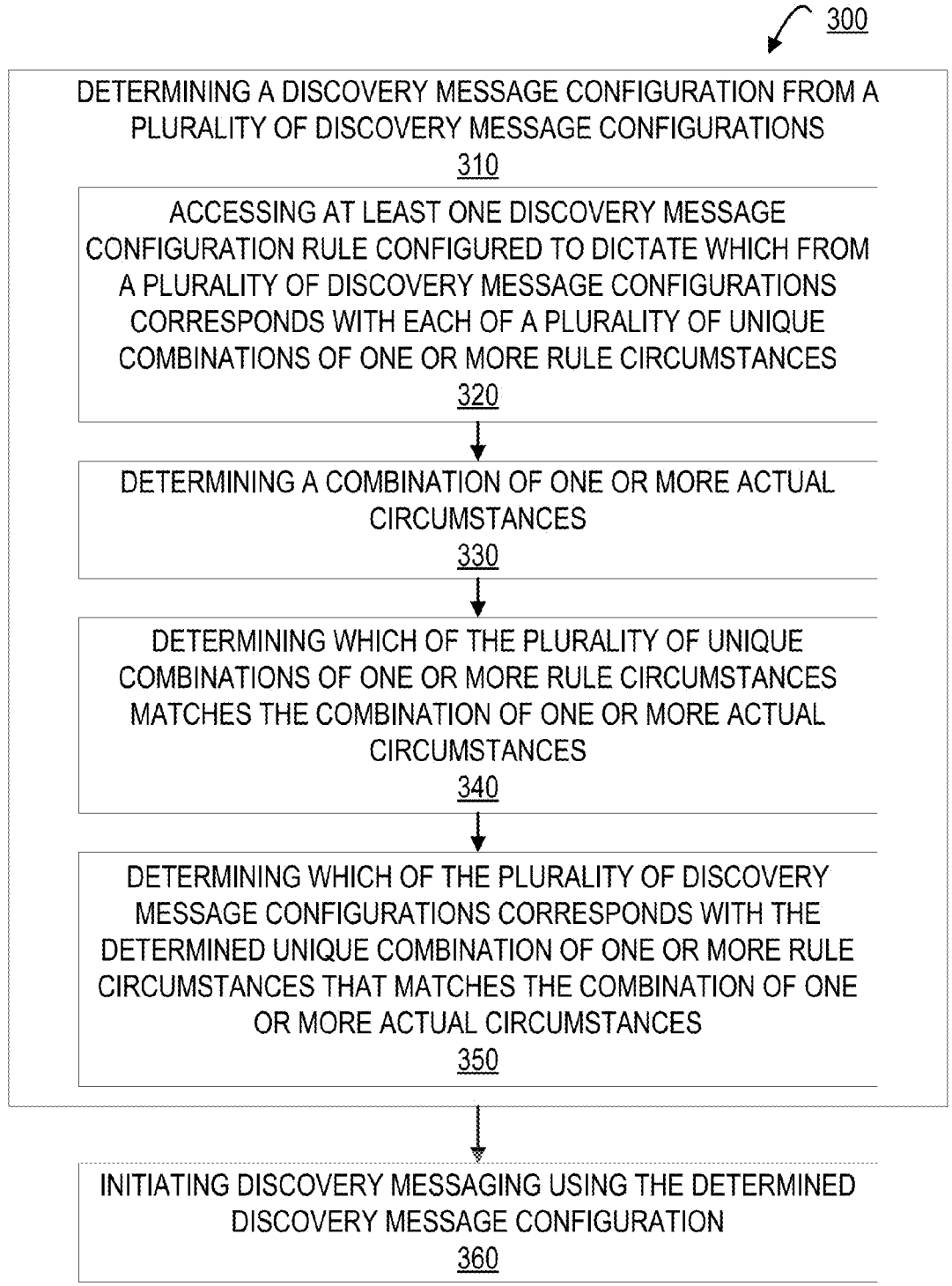

Having thus described embodiments of the invention in general terms, reference will now be made to the accompanying drawings, where:

FIG. 1 illustrates various network coverage scenarios for two proximate user equipment devices;

FIG. 2 illustrates an environment wherein user equipment devices and network systems operate according to embodiments of the invention; and FIG. 3 illustrates a flowchart of a method 300 for enhancing ProSe device to device discovery according to embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention involve selection of one a discovery message method configuration for use when the UE is involved in discovery with another UE. It is expected that two primary discovery message method configurations will be used. The first configuration is for communication over the "physical layer" of the network model (e.g., the OSI Model) and is a fixed length direct discovery message method configuration (DD Configuration). The second configuration is for discovery message method sent over data communication channel, and likely over a layer of the network model that is "higher" than the physical layer and is a variable length message configuration called Discovery through Communication (DTC Configuration). The selection between the two discovery message method configurations is based on a set of rules that may be based on signaling type, pre-configuration or various sets of circumstances dictating either DD or DTC. One advantage of this proposal is to clearly define UE behavior when two discovery message method configurations are available, where each configuration has advantages in different scenarios. Thus, an appropriate message configuration may be selected based on the set of rules such that benefits are maximized and/or drawbacks are minimized.

As discussed above, the DD Configuration uses a fixed physical layer format. An advantage of such a format is that the fixed length of about 140 bits may be inserted into one physical resource block. Therefore, encoding and decoding can be optimized and efficient performance may be assured. However, this discovery method may have some disadvantages as well. For example, the length is limited, and therefore the amount of information that may be carried in the discovery message method is likewise limited. It is estimated that the capacity of the DD Configuration discovery message method may only accommodate a user ID and an application ID. Accordingly, the DD Configuration does not support a specific group of users or service available information or the like.

On the other hand, the DTC Configuration provides a target discovery method that potentially utilizes the MAC/RLC/PDCP message structure. One advantage of this configuration is flexibility in message length, and therefore, various scenarios may be supported. This configuration does not require network resource assistance for discovery, and it can support discovery as long as D2D communication channel has been established. Further, this configuration supports discovery of specific groups of users. However, the variable length of this configuration yields inconsistency in format across applications. This may result in difficulty optimizing the coding performance and much lower or non-predictable transmission range for discovery performance. Because of these benefits and drawbacks, the DTC Configuration may be better suited than the DD Configuration for public safety types of users.

It is expected that both discovery message method configurations will be specified for different purposes, and the configurations of the two configurations, at this time, lack standardization.

Referring now to FIG. 1, a network environment 100 is illustrated in accordance with one embodiment of the present invention. As illustrated in FIG. 1, some UEs may be connected to the network, such as connected UE 110A and UE 110B. In the embodiment shown, UE 110C is not connected to the network, but is part of a D2D communication link with UEs 110A and 110B. Thus, for various embodiments of the invention discussed herein, it is assumed that the UE and/or the D2D group of users has already established one or more D2D communication link(s) over broadcast and/or unicast channels.

Referring now to FIG. 2, a network environment 200 is illustrated in accordance with one embodiment of the present invention. As illustrated in FIG. 2, the network system 208 is operatively coupled, via a network 201 to the user equipment 204 and/or 206. In this configuration, the network system 208 may send information to and receive information from the user equipment devices 204 and/or 206. FIG. 2 illustrates only one example of an embodiment of a network environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), a telecommunication network or any other type of network or combination of networks. The network 201 may provide for wireline, wireless, or a combination wireline and wireless communication between devices on the network 201. In some embodiments, the users 202 and 205 are individuals who maintain cellular products with one or more providers.

As illustrated in FIG. 2, the network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201. As such, the communication device 246 generally comprises a modem, server, or other device for communicating with other devices on the network 201.

As further illustrated in FIG. 2, the network system 208 comprises computer-readable instructions 254 stored in the memory device 250, which in one embodiment includes the computer-readable instructions 254 of an application 258. In some embodiments, the memory device 250 includes data storage 252 for storing data related to and/or used by the application 258.

In some embodiments, the application 258 may allow for communications between the UEs 204 and 206 with or without assistance from the network 201.

As illustrated in FIG. 2, the user equipment 206 generally comprises a communication device 236, a processing device 238, and a memory device 240. The processing device 238 is operatively coupled to the communication device 236 and the memory device 240. In some embodiments, the processing device 238 may send or receive data from the user equipment 204, and/or the network system 208 via the communication device 236 over a network 201. As such, the communication device 236 generally comprises a modem, server, or other device for communicating with other devices on the network 201.

As further illustrated in FIG. 2, the user equipment 206 comprises computer-readable instructions 242 stored in the memory device 240, which in one embodiment includes the computer-readable instructions 242 of an application 244. In the embodiment illustrated in FIG. 2, the application 244 allows the user equipment 206 to be linked to the network system 208 to communicate, via a network 201. The application 244 may also allow the user equipment 206 to connect directly (i.e., locally or device to device) with the user equipment 204 for proximity services (e.g., using either cellular based links or non-cellular based links).

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 3, a flowchart illustrates a method 300 for enhancing ProSe device to device discovery according to embodiments of the invention. The first step, represented by block 310, is determining a discovery message method configuration from a plurality of discovery message method configurations. As discussed above, it is expected that both DD Configuration and DTC Configuration will be available, and each has associated benefits and drawbacks. For example, for some types of discovery requiring enabled security or target group discovery, the discovery message method size will need to be larger than the DD Configuration may accommodate, and thus the DTC Configuration will need to be used. The next step, represented by block 360, is to initiate discovery messaging using the determined discovery message method configuration.

Step 310 has several potential sub-steps, as represented by blocks 320, 330, 340 and 350. Block 320 represents the sub-step of accessing at least one discovery message method configuration rule configured to dictate which from a plurality of discovery message method configurations corresponds with each of a plurality of unique combinations of one or more rule circumstances. Block 330 represents the sub-step of determining a combination of one or more actual circumstances. Block 340 represents determining which of the plurality of unique combinations of one or more rule circumstances matches the combinations of one or more actual circumstances. Block 350 represents determining which of the plurality of discovery message method configurations corresponds with the determined unique combination of one or more rule circumstances that matches the combination of one or more actual circumstances.

In various embodiments, one or more of sub-steps 320, 330, 340 and/or 350 may be accomplished concurrently or substantially concurrently, that is, by completing one or more actions at approximately the same time. In some simple applications of an embodiment of the invention, sub-steps 320, 330, 340 and 350 are performed as one step/sub-step and/or are performed without significant data processing burden. In other words, the referenced "plurality of unique combinations of one or more rule circumstances" may, in some embodiments, refer only to a set of two circumstances (e.g., a stored set of rule circumstances may consist of a first entry of a "1" bit and a second entry of a "0" bit). Further, the "combination of one or more actual circumstances" may, in some embodiments, refer only to a single circumstance (e.g., an indicator being a "1" bit or a "0" bit). Accordingly, when the actual circumstance is matched to one of the unique combinations of rule circumstances, the match is relatively simple.

For example, in a case where a discovery message method configuration rule dictates that a user device use the DD Configuration if a received (or user device stored) indicator is positive and use the DTC Configuration if the indicator is negative, then sub-steps 320, 330, 340 and 350 are intended to be interpreted broadly to encompass determining the contents of the indicator (see sub-step 330), comparing its contents to a standard or stored reference (see sub-step 340), and then determining from this comparison which configuration should be used (see sub-step 350).

Conversely, sub-steps 320, 330, 340 and 350 are also intended to encompass a complex scenario where multiple complicated circumstances are considered. Thus, the unique combinations of rule circumstances may be stored in a comprehensive database such that they may be matched to a complex set of actual circumstances so that the user device may determine which discovery message method configuration should be used.

In various embodiments of the invention, explicit signaling may dictate the discovery message method configuration to be used. For example, UEs in a cell or in a public safety group can be configured to use the DD Configuration or the DTC Configuration by using dedicated or non-dedicated radio resource control (RRC) signaling and/or beacon signaling or other control signaling (dedicated or non-dedicated). For example, in some embodiments, a discovery message method configuration indicator includes one or more bits that indicate which discovery message method configuration should be used. In one embodiment, the indicator is only one bit and indicates whether the DD Configuration or the DTC Configuration should be used. UEs receiving the indicator will only enable the indicated configuration.

In another embodiment, the indicator is multiple bits and includes one or more bits that indicate the discovery message method configuration that should be used given a certain type of discovery. For example, the discovery message method configuration indicator may include information indicating that the DD Configuration should be used if any one of a plurality of a first type of discovery user cases is to be used and indicating that the DTC Configuration should be used if any one of a plurality of a second type of discovery user cases is to be used. The discovery user cases are defined in 3GPP 22.803, including some that are more suitable for the DD Configuration and some that are more suitable for the DTC Configuration.

In some such embodiments, determining an actual type of discovery to be used includes determining whether the actual type of discovery to be used is a closed loop discovery or an open loop discovery. In these cases, the plurality of first types of discovery comprises the open loop discovery, and the plurality of second types of discovery comprises the closed loop discovery, such that the DD Configuration should be used for open loop discovery and the DTC Configuration should be used for closed loop discovery.

In other such embodiments, determining an actual type of discovery to be used comprises determining whether the actual type of discovery to be used is a Mode B type of discovery or a Mode A type of discovery. In these cases, the plurality of first types of discovery comprises the Mode A type of discovery, and the plurality of second types of discovery comprises the Mode B type of discovery, such that the DD Configuration should be used for the Mode A type of discovery and the DTC Configuration should be used for the Mode B type of discovery.

The network node or other network component, such as an eNB may use RRC signaling to communicate the discovery message method configuration indicator to UEs. The indicator may be included in a system information block (SIB) or as part of a dedicated RRC signaling.

A UE may be part of a group of UEs that has a group head. The group head may use beacon signaling to communicate with the members of the group, and the group head may communicate the discovery message method configuration indicator to the UEs in the group using beacon signaling or some other control signaling, either dedicated or non-dedicated.

In various embodiments of the invention, UEs may be preconfigured to use a particular discovery message method configuration. In one embodiment, UEs only use the DD Configuration if they are configured for use as a commercial user type, and UEs only use the DTC Configuration if they are configured for use as a public safety user type. In another embodiment, UEs that are configured as public safety user types can be configured to use the DTC Configuration when they are outside network coverage and use the DD Configuration when they are within network coverage. In another embodiment, public safety user type UEs can be configured to use the DTC Configuration when there is a need to find other public safety users and to use the DD Configuration when there is a need to find commercial users. In another embodiment, UEs can be configured to use the DTC Configuration for certain specific types of discovery and to use the DD Configuration for other specific types of discovery.

In various embodiments of the invention, rules can dictate which discovery message method configuration will be used by UEs. In various embodiments, one or more of the rules discussed herein and/or other rules may be used to determine which discovery message method configuration is used. For example, in some cases only one rule dictates the proper configuration, and in other cases multiple rules dictate the proper configuration. In some cases, the one or more rules dictate that the UE uses the DD Configuration. When the UE is within network coverage and has network assistance on dedicated discovery resources, one or more rules may dictate to use the DD Configuration. When the UE is a public safety group, and the group head is assigned dedicated discovery resources, one or more rules may dictate the UE use the DD Configuration. Likewise, when the UE will be making a one-to-one unicast discovery to other proximate UEs, one or more rules may dictate the UE use the DD Configuration. Further, when the UE has capability only for the DD Configuration, then one or more rules may dictate the UE use the DD Configuration. Similarly, when the UE does not have the capability to use the DTC Configuration, then one or more rules may dictate the UE use the DD Configuration.

In other embodiments of the invention, rules can dictate which discovery message method configuration will be used by UEs. In one instance, the UE is outside network coverage and has no network or group head assistance on dedicated discovery resources, and the rules dictate the UE use the DTC Configuration. When the UE intends to make a groupcast or broadcast discovery on proximate UEs, the rules may dictate the UE use the DTC Configuration. Also, when the UE needs to make a certain type of discovery where security related information, UE application state, and/or UE capabilities must be included in the discovery, then the rules may dictate that the UE use the DTC Configuration so that the variable length of the DTC Configuration may be utilized. Further, when the UE only has capability to support the DTC Configuration, then the rules may dictate that the UE use the DTC Configuration. Similarly, when the UE is incapable of using the DD Configuration, then the rules may dictate the UE use the DTC Configuration. Finally, the rules may dictate that when the DD Configuration is unavailable, the DTC Configuration may be used as a default or fall back.

In some embodiments of the invention, multiple UEs (more than two) may be involved in proximate services discovery. For example, the sending UE may send one or more discovery message methods to multiple proximate UEs, which in turn may send multiple response messages to the sending UE. In some cases, there are one or more groups of UEs that operate in a collaborative fashion such that they are linked collectively to one or more other UEs, either individually and/or as a group.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for enhancing proximity service (ProSe) device to device (D2D) discovery, the method comprising:
    determining, by a user device, a discovery message method configuration from a plurality of predefined discovery message method configurations, wherein determining comprises:
        accessing at least one discovery message method configuration rule configured to dictate which from the plurality of discovery message method configurations corresponds with each of a plurality of unique combinations of one or more rule circumstances;
        determining a combination of one or more actual circumstances;
        determining which of the plurality of unique combinations of one or more rule circumstances matches the combination of one or more actual circumstances;
        determining which of the plurality of discovery message method configurations corresponds with the determined unique combination of one or more rule circumstances that matches the combination of one or more actual circumstances; and
    initiating, by the user device, discovery messaging using the determined discovery message method configuration,
    wherein the plurality of predefined discovery message method configurations are distinguishable based on (i) a length of the message being fixed or variable, and (ii) a layer of a networking model used for communicating the message.

2. The method of claim 1, wherein the plurality of discovery message method configurations comprise:
    (i) a fixed length direct discovery message method configuration (DD Configuration), wherein the DD Configuration is configured for use over a physical layer of a networking model and wherein the physical layer is the lowest layer of the networking model; and
    (ii) a discovery through communication variable length discovery message method configuration (DTC Configuration), wherein the DTC Configuration is configured for use over a layer of the networking model that is higher than the physical layer.

3. The method of claim 2, wherein the user device is one of a plurality of user devices, which together form a user device group.

4. The method of claim 3, further comprising:
    receiving, by the user device, a control message comprising a discovery message method configuration indicator;
    wherein the control message is received using dedicated radio resource control (RRC) signaling, non-dedicated RRC signaling, dedicated control signaling or beacon signaling;
    wherein determining a combination of one or more actual circumstances comprises determining that the combination of one or more actual circumstances consists of the discovery message method configuration indicator;
    wherein determining which of the plurality of unique combinations of one or more circumstances matches the combination of one or more actual circumstances comprises:
        determining data from the discovery message method configuration indicator; and
        matching the determined data with one of the plurality of unique combinations of one or more rule circumstances;
    wherein determining which of the plurality of discovery message method configurations corresponds with the determined unique combination of one or more rule circumstances that matches the combination of one or more actual circumstances comprises:
        determining which of the DD Configuration or the DTC Configuration to use for discovery message method configuration; and
        enabling, by the user device, only the DD Configuration or the DTC Configuration based on the determination of which configuration to use as the determined discovery message method configuration.

5. The method of claim 4, wherein the discovery message method configuration indicator consists of one bit of data configured to indicate either the DD Configuration or the DTC Configuration for use as the determined discovery message method configuration.

6. The method of claim 4, wherein the discovery message method configuration indicator comprises a plurality of bits of data configured to indicate that the DD Configuration should be used for a first plurality of types of discovery user cases and to indicate that the DTC Configuration should be used for a second plurality of types of discovery user cases.

7. The method of claim 2, further comprising:
wherein accessing at least one discovery message method configuration rule comprises:
accessing, by the user device from a memory device of the user device, one or more pre-configuration rules.

8. The method of claim 7,
wherein determining a combination of one or more actual circumstances comprises determining that the user device is configured as a commercial user type or a public safety user type;
wherein determining which of the plurality of unique combinations of one or more circumstances matches the combination of one or more actual circumstances comprises:
matching the commercial user type or the public safety user type, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used, if the user device is configured as a commercial user type, and that the DTC Configuration should be used, if the user device is configured as a public safety type, for discovery message method configuration; and
the method further comprising:
enabling, by the user device, only the DD Configuration or the DTC Configuration based on the determination of which configuration to use as the determined discovery message method configuration.

9. The method of claim 7,
wherein determining a combination of one or more actual circumstances comprises determining that the user device is configured as a public safety user type and determining that the user device is within network coverage or outside network coverage;
wherein determining which of the plurality of unique combinations of one or more circumstances matches the combination of one or more actual circumstances comprises:
matching the public safety user type and within network coverage or the public safety user type and outside network coverage, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used, if the user device is configured as a public safety user type and is within network coverage, and that the DTC Configuration should be used, if the user device is configured as a public safety user type and is outside network coverage, for discovery message method configuration; and
the method further comprising:
enabling, by the user device, only the DD Configuration or the DTC Configuration based on the determination of which configuration to use as the determined discovery message method configuration.

10. The method of claim 7,
wherein determining a combination of one or more actual circumstances comprises determining that the user device is configured as a public safety user type and determining that there is a need to find other public safety user devices or that the user device is configured as a public safety user type and determining there is a need to find commercial user devices;
wherein determining which of the plurality of unique combinations of one or more circumstances matches the combination of one or more actual circumstances comprises:
matching the public safety user type and need to find other public safety user devices or the public safety user type and need to find commercial user devices, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used, if the user device is configured as a public safety user type and there is a need to find commercial users, and that the DTC Configuration should be used, if the user device is configured as a public safety user type and there is a need to find other public safety user devices, for discovery message method configuration; and
the method further comprising:
enabling, by the user device, only the DD Configuration or the DTC Configuration based on the determination of which configuration to use as the determined discovery message method configuration.

11. The method of claim 7,
wherein determining a combination of one or more actual circumstances comprises determining an actual type of discovery to be used;
wherein determining which of the plurality of unique combinations of one or more circumstances matches the combination of one or more actual circumstances comprises:
matching the actual type of discovery to be used with one of a plurality of first types of discovery or one of a plurality of second types of discovery, wherein each of the plurality of first types of discovery and each of the plurality of second types of discovery correspond with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used, if one of the plurality of first types of discovery is to be used, and that the DTC Configuration should be used, if one of the plurality of second types of discovery is to be used, for discovery message method configuration; and
the method further comprising:
enabling, by the user device, only the DD Configuration or the DTC Configuration based on the determination of which configuration to use as the determined discovery message method configuration.

12. The method of claim 11,
wherein determining an actual type of discovery to be used comprises determining whether the actual type of discovery to be used is a closed loop discovery or an open loop discovery;
wherein the plurality of first types of discovery comprises the open loop discovery; and
wherein the plurality of second types of discovery comprises the closed loop discovery, such that the DD Configuration should be used for open loop discovery and the DTC Configuration should be used for closed loop discovery.

13. The method of claim 11,
wherein determining an actual type of discovery to be used comprises determining whether the actual type of discovery to be used is a Mode B type of discovery or a Mode A type of discovery;
wherein the plurality of first types of discovery comprises the Mode A type of discovery; and
wherein the plurality of second types of discovery comprises the Mode B type of discovery, such that the DD Configuration should be used for the Mode A type of discovery and the DTC Configuration should be used for the Mode B type of discovery.

14. The method of claim 2,
wherein determining a combination of one or more actual circumstances comprises determining that the user device is within network coverage and has network assistance on one or more dedicated discovery resources;
wherein determining which of the plurality of unique combinations of one or more circumstances matches the combination of one or more actual circumstances comprises:
matching that the user device is within network coverage and has network assistance on one or more dedicated discovery resources, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used for discovery message method configuration; and
the method further comprising:
enabling, by the user device, only the DD Configuration based on the determination to use DD Configuration as the determined discovery message method configuration.

15. The method of claim 2,
wherein determining a combination of one or more actual circumstances comprises determining that the user device is part of a public safety group comprising a group head having assigned dedicated discovery resources;
wherein determining which of the plurality of unique combinations of one or more circumstances matches the combination of one or more actual circumstances comprises:
matching that the that the user device is part of a public safety group comprising a group head having assigned dedicated discovery resources, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used for discovery message method configuration; and
the method further comprising:
enabling, by the user device, only the DD Configuration based on the determination to use DD Configuration as the determined discovery message method configuration.

16. The method of claim 2,
wherein determining a combination of one or more actual circumstances comprises determining that the user device will engage in a one-to-one unicast discovery within a predetermined period of time;
wherein determining which of the plurality of unique combinations of one or more circumstances matches the combination of one or more actual circumstances comprises:
matching that the user device will engage in a one-to-one unicast discovery within a predetermined period of time, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used as the determined discovery message method configuration; and
the method further comprising:
enabling, by the user device, only the DD Configuration based on the determination to use DD Configuration as the determined discovery message method configuration.

17. The method of claim 2,
wherein determining a combination of one or more actual circumstances comprises determining that the user device is only capable of supporting the DD Configuration;
wherein determining which of the plurality of unique combinations of one or more circumstances matches the combination of one or more actual circumstances comprises:
matching that the user device is only capable of supporting the DD Configuration, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
determining that the DD Configuration should be used as the determined discovery message method configuration; and
the method further comprising:

enabling, by the user device, only the DD Configuration based on the determination to use DD Configuration as the determined discovery message method configuration.

18. The method of claim 2,
wherein determining a combination of one or more actual circumstances comprises determining that the user device is incapable of supporting the DTC Configuration;
wherein determining which of the plurality of unique combinations of one or more circumstances matches the combination of one or more actual circumstances comprises:
   matching that the user device is incapable of supporting the DTC Configuration, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
   determining that the DD Configuration should be used as the determined discovery message method configuration; and
the method further comprising:
enabling, by the user device, only the DD Configuration based on the determination to use DD Configuration as the determined discovery message method configuration.

19. The method of claim 2,
wherein determining a combination of one or more actual circumstances comprises determining that the user device is outside network coverage and has no network or group head assistance on dedicated discovery resources;
wherein determining which of the plurality of unique combinations of one or more circumstances matches the combination of one or more actual circumstances comprises:
   matching that the user device is outside network coverage and has no network or group head assistance on dedicated discovery resources, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
   determining that the DTC Configuration should be used as the determined discovery message method configuration; and
the method further comprising:
enabling, by the user device, only the DTC Configuration based on the determination to use DTC Configuration as the determined discovery message method configuration.

20. The method of claim 2,
wherein determining a combination of one or more actual circumstances comprises determining that the user device will engage a groupcast or broadcast discovery within a predetermined period of time;
wherein determining which of the plurality of unique combinations of one or more circumstances matches the combination of one or more actual circumstances comprises:
   matching that the user device will engage a groupcast or broadcast discovery within a predetermined period of time, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
   determining that the DTC Configuration should be used as the determined discovery message method configuration; and
the method further comprising:
enabling, by the user device, only the DTC Configuration based on the determination to use DTC Configuration as the determined discovery message method configuration.

21. The method of claim 2,
wherein determining a combination of one or more actual circumstances comprises determining that the user device will engage one of a plurality of types of discovery each requiring security related information, user device application state or user device capabilities within a predetermined period of time;
wherein determining which of the plurality of unique combinations of one or more circumstances matches the combination of one or more actual circumstances comprises:
   matching that the user device will engage one of a plurality of types of discovery each requiring security related information, user device application state or user device capabilities within a predetermined period of time, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:
   determining that the DTC Configuration should be used for discovery message method configuration; and
the method further comprising:
enabling, by the user device, only the DTC Configuration based on the determination to use DTC Configuration as the determined discovery message method configuration.

22. The method of claim 2,
wherein determining a combination of one or more actual circumstances comprises determining that the user device is only capable of supporting the DTC Configuration;
wherein determining which of the plurality of unique combinations of one or more circumstances matches the combination of one or more actual circumstances comprises:
   matching that the user device is only capable of supporting the DTC Configuration, as determined by the user device, with one of the plurality of unique combinations of one or more rule circumstances;
wherein determining which of the plurality of discovery message method configurations corresponds with the determined unique combination of one or more rule circumstances that matches the combination of one or more actual circumstances comprises:

determining that the DTC Configuration should be used for discovery message method configuration; and the method further comprising:

enabling, by the user device, only the DTC Configuration based on the determination to use DTC Configuration as the determined discovery message method configuration.

23. The method of claim 2, wherein determining a combination of one or more actual circumstances comprises determining that the user device is incapable of supporting the DD Configuration;

wherein determining which of the plurality of unique combinations of one or more circumstances matches the combination of one or more actual circumstances comprises:

matching that the user device is incapable of supporting the DD Configuration, as determined by the user device, with one of the plurality of unique combinations of one or more rule circumstances;

wherein determining which of the plurality of discovery message method configurations corresponds with the determined unique combination of one or more rule circumstances that matches the combination of one or more actual circumstances comprises:

determining that the DTC Configuration should be used for discovery message method configuration; and the method further comprising:

enabling, by the user device, only the DTC Configuration based on the determination to use DTC Configuration as the determined discovery message method configuration.

24. The method of claim 2, wherein determining a combination of one or more actual circumstances comprises determining that the DD Configuration is unavailable for the user device to use for discovery messaging;

wherein determining which of the plurality of unique combinations of one or more circumstances matches the combination of one or more actual circumstances comprises:

matching that the DD Configuration is unavailable for the user device to use for discovery messaging, as determined by the user device, with one of the plurality of unique combinations of one or more rule circumstances;

wherein determining which of the plurality of discovery message method configurations corresponds with the determined unique combination of one or more rule circumstances that matches the combination of one or more actual circumstances comprises:

determining that the DTC Configuration should be used for discovery message method configuration; and the method further comprising:

enabling, by the user device, only the DTC Configuration based on the determination to use DTC Configuration as the determined discovery message method configuration.

25. A user device for enhancing proximity service (ProSe) device to device (D2D) discovery, the apparatus comprising:

a memory;

a processor; and a module stored in the memory, executable by the processor, and configured to:

determine a discovery message method configuration from a plurality of discovery message method configurations, wherein determining comprises:

accessing at least one discovery message method configuration rule configured to dictate which from the plurality of discovery message method configurations corresponds with each of a plurality of unique combinations of one or more rule circumstances;

determining a combination of one or more actual circumstances;

determining which of the plurality of unique combinations of one or more rule circumstances matches the combination of one or more actual circumstances; and determining which of the plurality of discovery message method configurations corresponds with the determined unique combination of one or more rule circumstances that matches the combination of one or more actual circumstances; and initiating discovery messaging using the determined discovery message method configuration, wherein the plurality of predefined discovery message method configurations are distinguishable based on (i) a length of the message being fixed or variable, and (ii) a layer of a networking model used for communicating the message.

26. A computer program product for enhancing proximity service (ProSe) device to device (D2D) discovery, the computer program product comprising:

a non-transitory computer-readable medium comprising a set of codes for causing a computer to:

determine a discovery message method configuration from a plurality of discovery message method configurations, wherein determining comprises:

accessing at least one discovery message method configuration rule configured to dictate which from the plurality of discovery message method configurations corresponds with each of a plurality of unique combinations of one or more rule circumstances;

determining a combination of one or more actual circumstances;

determining which of the plurality of unique combinations of one or more rule circumstances matches the combination of one or more actual circumstances; and determining which of the plurality of discovery message method configurations corresponds with the determined unique combination of one or more rule circumstances that matches the combination of one or more actual circumstances; and initiate discovery messaging using the determined discovery message method configuration, wherein the plurality of predefined discovery message method configurations are distinguishable based on (i) a length of the message being fixed or variable, and (ii) a layer of a networking model used for communicating the message.

* * * * *